(Model.)

6 Sheets—Sheet 3.

W. N. WHITELEY & J. R. THOMAS.
SELF BINDER.

No. 265,199. Patented Sept. 26, 1882.

Attest
J. C. Turner
E. C. Ford

Inventors
W. N. Whiteley
J. R. Thomas
By their Atty
R. W. Smith

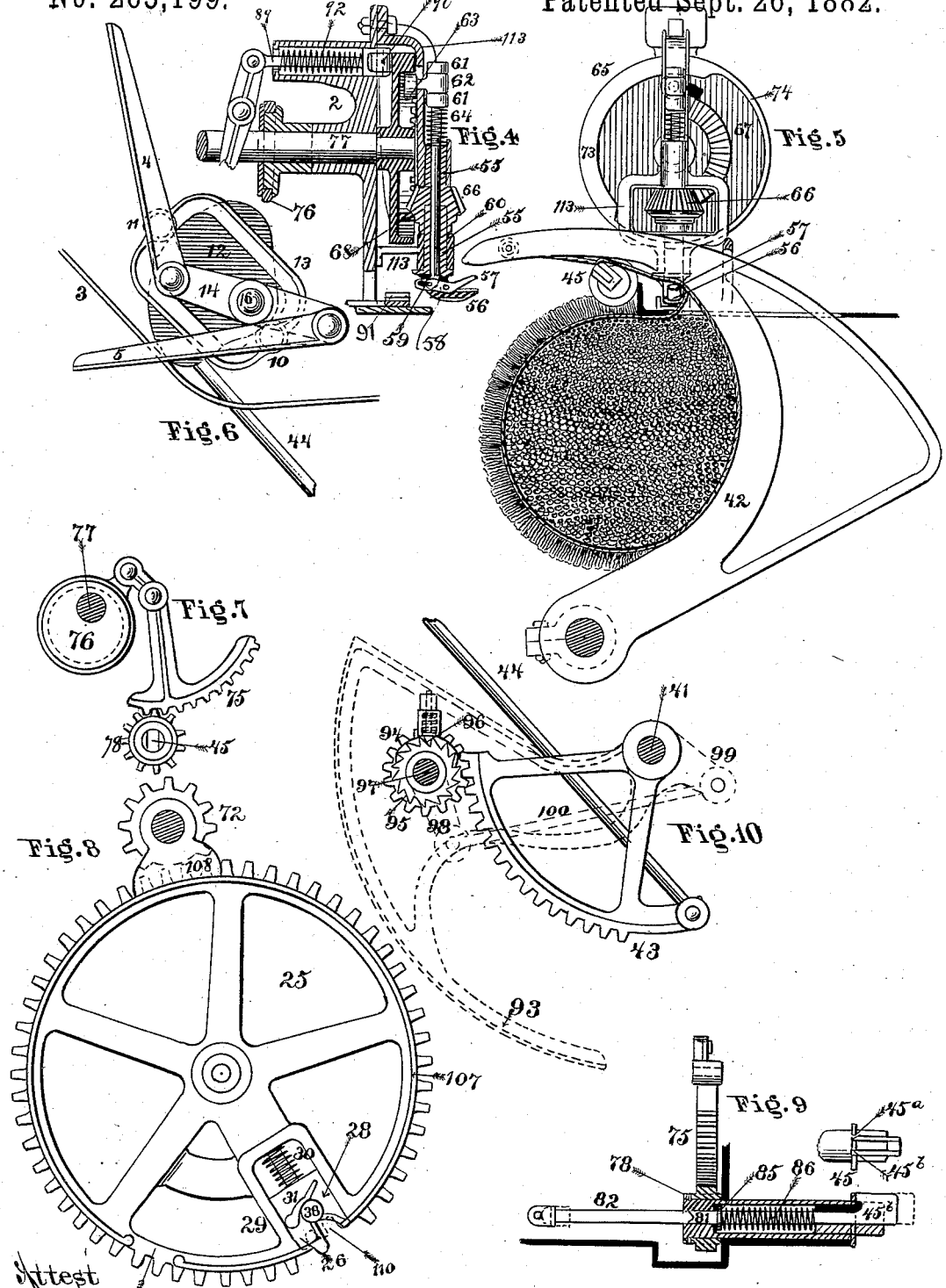

(Model.) 6 Sheets—Sheet 5.
W. N. WHITELEY & J. R. THOMAS.
SELF BINDER.
No. 265,199. Patented Sept. 26, 1882.
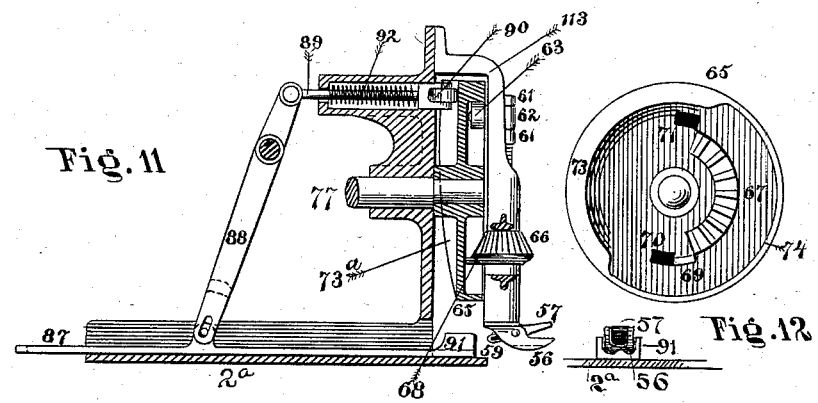
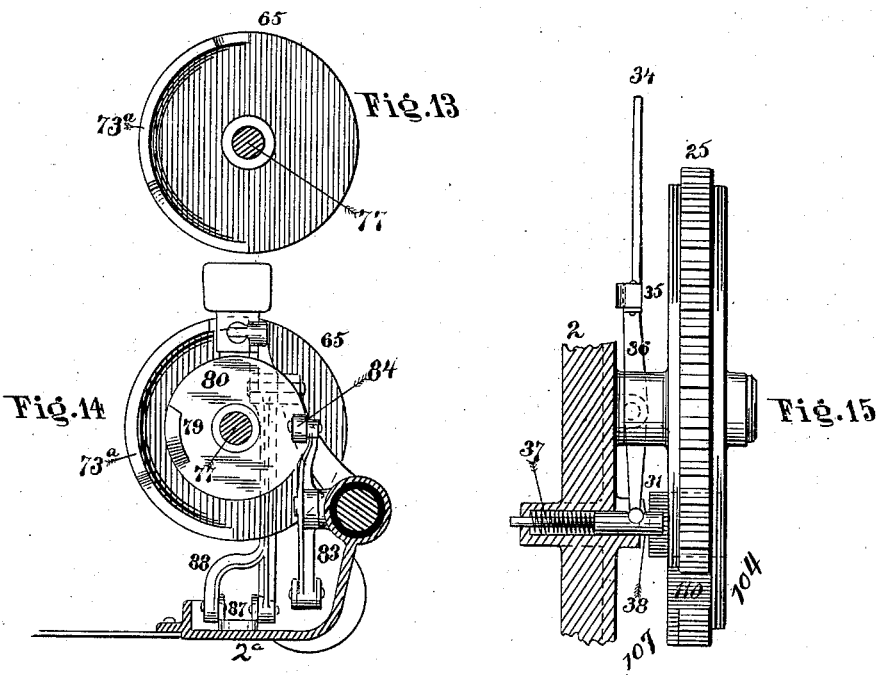
Attest
J. C. Turner
E. C. Ford
Inventors
W. N. Whiteley
J. R. Thomas
By their Atty
R. D. O. Smith (Model.) 6 Sheets—Sheet 6.

W. N. WHITELEY & J. R. THOMAS.
SELF BINDER.

No. 265,199. Patented Sept. 26, 1882.

Attest:
J. C. Turner
E. C. Ford

Inventor:
Wm N. Whiteley
J. R. Thomas
By R. N. O. Smith
atty

UNITED STATES PATENT OFFICE.

WILLIAM N. WHITELEY AND JOHN R. THOMAS, OF SPRINGFIELD, OHIO, ASSIGNORS TO WHITELEY, FASSLER & KELLY, OF SAME PLACE.

SELF-BINDER.

SPECIFICATION forming part of Letters Patent No. 265,199, dated September 26, 1882.

Application filed January 30, 1882. (Model.)

*To all whom it may concern:*

Be it known that we, WILLIAM N. WHITELEY and JOHN R. THOMAS, of Springfield, county of Clarke, State of Ohio, have invented a new and useful Improvement in Self-Binders, of which the following is a specification.

Figure 1:
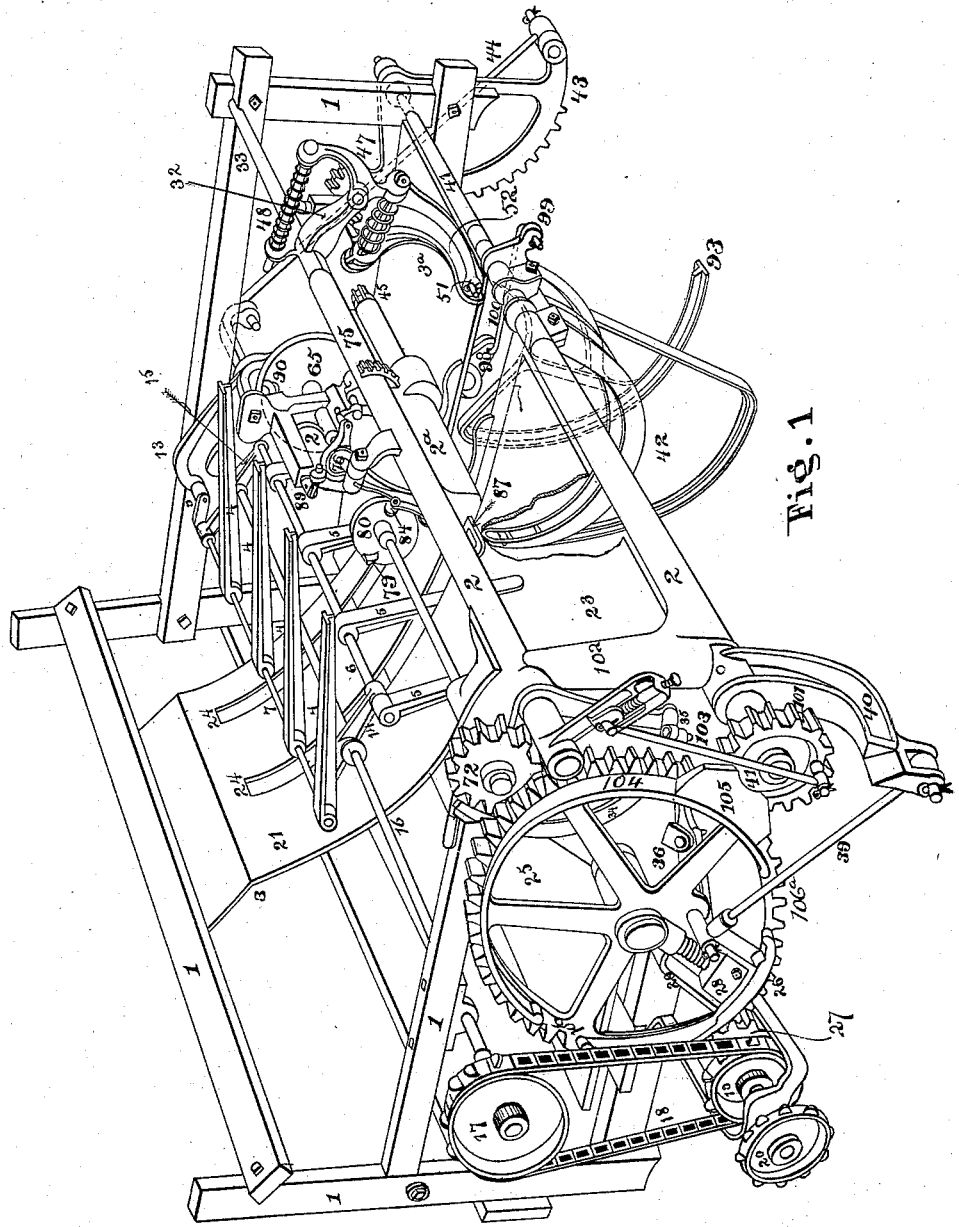
Figure 2:
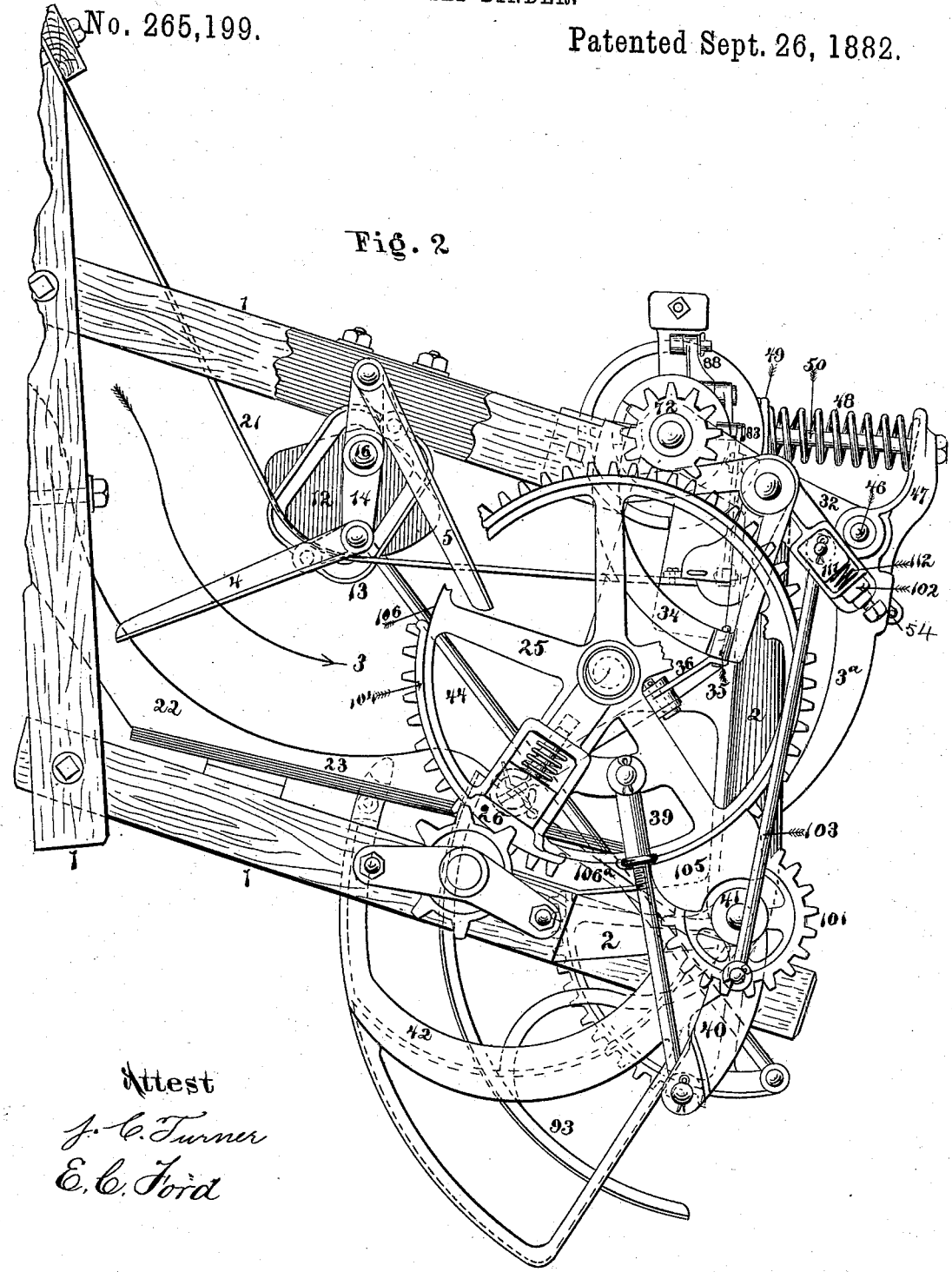
Figure 3:
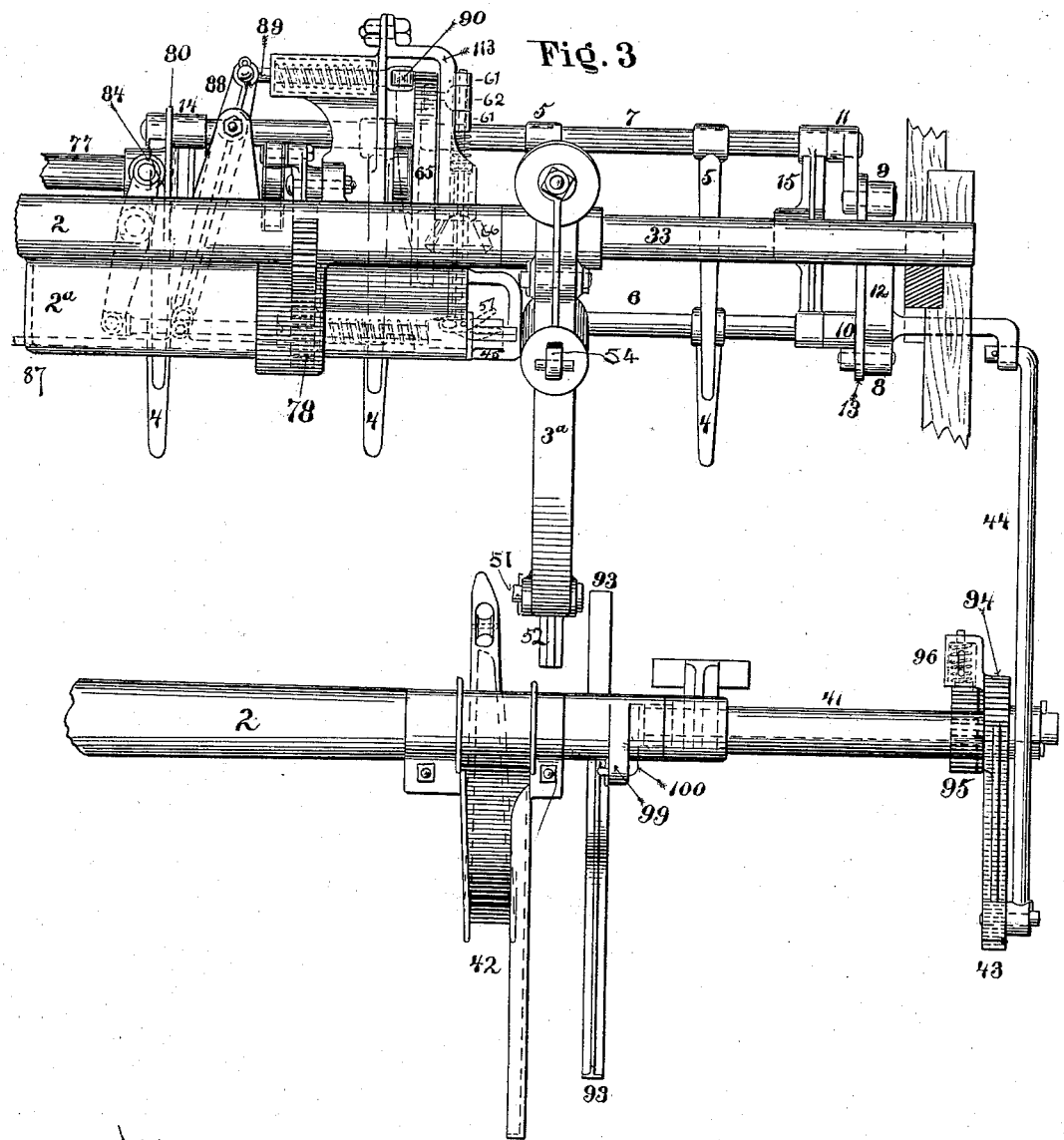
Figure 16:
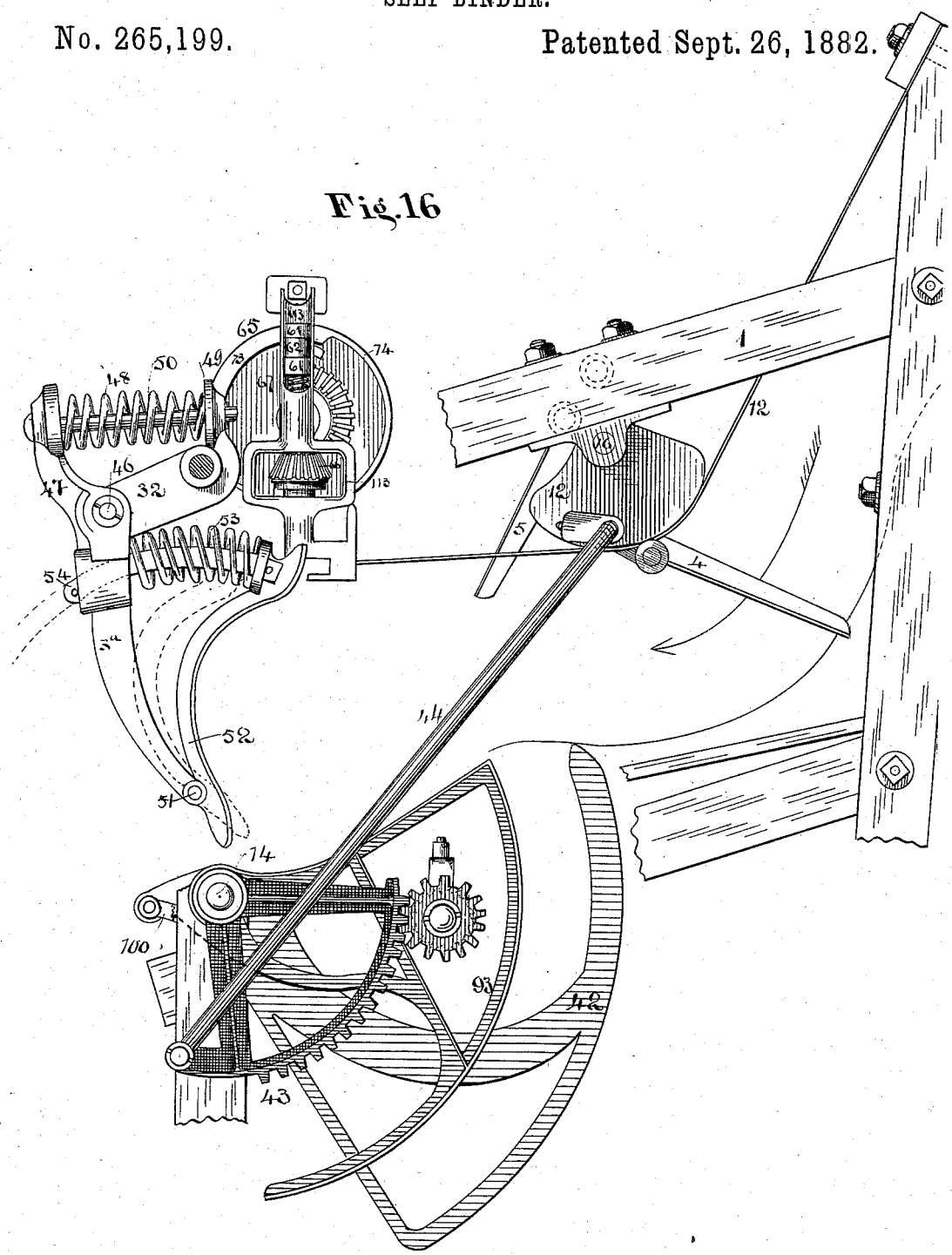

In the accompanying drawings, Figure 1 is a perspective view of a self-binder embodying our improvements. Fig. 2 is an end elevation of the same. Fig. 3 is a partial side elevation. Fig. 4 is a partial sectional elevation of the knotting device. Fig. 5 is a side view of the binding-arm encircling a sheaf with a band and delivering the ends thereof to the gripper and knotting-hook. Fig. 6 is an end view of the packing device in the position it assumes after the binding mechanism is set in motion, and is thereby relieved from duty during the binding of a sheaf. Fig. 7 is a sectional elevation of the mechanism employed to impart an oscillatory motion to the gripper, so that it may yield mechanically to the knotter during the operation of knotting the ends of the band material. Fig. 8 is an elevation of the inner side of the main gear-wheel. Fig. 9 is a longitudinal sectional elevation of the cutter and gripper of the knotting device. Fig. 10 is an elevation of the gear used to give motion to the ejector and to transpose the cam mechanism of the packing device. A plan view of the cutter and gripper forms a part of Fig. 9. Fig. 11 is a sectional elevation, illustrating the timing mechanism of the knotter-gear and the device used for stripping the knot from the knotter. Fig. 12 is an elevation of the knotter-wheel, illustrative of the timing device used to throw the knotter-pinion properly into and out of gear with the segmental gear, also retain it when out of gear. Fig. 13 is a view of the cam upon the back of the knotter-wheel used to operate the stripping device. Fig. 14 is an elevation of the stripping mechanism and the mechanism employed to move the gripper and cutter in and out longitudinally. Fig. 15 is a partial sectional elevation of the main gear-wheel, illustrative of the device employed for throwing it in and out of gear with the continuously-running pinion of the harvesting-machine; and Fig. 16 is an end elevation, portions of the frame being omitted to show the compressing and other mechanism.

Our invention relates to self-binders that compress the grain into sheaves of uniform size, that automatically connect the binding mechanism with the harvesting mechanism, and that encircle the sheaf with a band and eject it from the machine to the ground without the aid of manual labor; and it consists in the construction and combination of devices, hereinafter described and claimed, for automatically binding grain.

To enable others skilled in the art to make and use our invention, we will proceed to describe its construction and operation.

In the accompanying drawings like numbers represent corresponding parts in each of the figures.

The mechanism composing the binder proper is mounted in a frame, 1 and 2, that may be adjustably connected to any desirable harvesting-machine in a suitable manner to adapt it to both long and short grain. As the grain is transferred from the harvester to a chute, 3, it comes into the path of a revolving packer, that gradually transfers it to and packs it against a spring compressor-arm, 3$^a$, until a sufficient quantity has accumulated to form a sheaf of the desired size, at which time the compressor-arm will retreat a sufficient distance to automatically connect the binding mechanism, which has remained at rest during the formation of said sheaf with the continuously-running harvesting machinery.

The packing device is composed of a series of arms, 4 and 5, secured to crank-shafts 6 and 7, that are controlled by friction-rollers 8 and 9, journaled to the cranks 10 and 11. These friction-rollers ride upon an irregular-shaped cam, 12, and are guided by a yoke, 13, that moves with and gives to them a fixed relative position. The shafts 6 and 7 are journaled in arms 14 and 15, that are secured to a shaft, 16, deriving its motion from a sprocket-wheel, 17, through the agency of a chain-belt, 18, and a continuously-running sprocket-wheel, 19. The sprocket-wheel 19 is secured to the same shaft as the sprocket-wheel 20, that derives its motion from the running-gear of the harvesting-machine.

The chute 3 is composed of a curved sheet-metal piece, 21, and the curved pieces 22, that project above the binding-table 23. The metal piece 21 is provided with slots 24, through which two sets of the packing-arms 4 and 5 work. The sheet-metal piece 21 prevents the grain from escaping in an upward direction and prevents entanglement of grain with packers, and the raised projections 22 serve to elevate the grain from the binding-table, so that the packers may be better able to act upon it.

The main gear-wheel 25 is provided with a movable section of teeth, 26, that may be moved in toward the center of said wheel in a suitable manner to make a gap in its teeth, and thereby disconnect it from the continuously-running pinion 27, from which it derives its motion. This movable section is provided with a sliding head, 28, moving in ways 29, a spring, 30, and an inclined cam-track, 31.

The compressor-arm $3^a$ is hinged to the free end of an arm, 32, that is fast to a rock-shaft, 33, upon which is secured an arm carrying a cam-track, 34, that is provided at one end with a recess, into which a friction-roller, 35, may fall when the binding mechanism is required to be at rest. The friction-roller 35 is attached to one end of a pivoted lever, 36, the other end of which is controlled by a spring, 37, acting against a bolt, 38, to which said end is attached. The accumulation of grain moves the compressor-arm outwardly, and the shaft 33 is rocked thereby, as is also the cam-track 34, and the friction-roller 35 is forced from the recess formed in one end of the cam-track 34, and rides upon the regular and even surface of said cam-track, thereby forcing back the bolt 38 and permitting the spring 30 to force the movable teeth 26 into mesh with the pinion 27, and thus unite the binding with the harvesting mechanism. The main gear-wheel 25, through the agency of a pitman, 39, connecting with an arm, 40, that is secured to a shaft, 41, oscillates the binding-arm 42, causing it first to move toward the compressor-arm $3^a$ to assist in the compression of grain, and also to place the band around the sheaf. A segment-gear, 43, is also attached to the shaft 41, and consequently moves simultaneously with the binding-arm, and through the agency of a connecting-rod, 44, that connects with the packer-cam 12, elevates said cam to a position illustrated by Fig. 6 of the drawings, thereby causing the packers 4 and 5 to rotate in a space above the incoming grain during the operation of binding.

Previous to starting the binding-machine in practical operation one end of the band is held by a combined gripper and cutter, 45, and the band is stretched from this gripper to the point of the binding-arm located below the binding-table 23 in such a manner that said band will lie across the path of the grain as it is forced by the packers against the compressor-arm, and in this manner the grain is partly encircled by a band previous to the upward movement of the binding-arm to complete the encircling of the sheaf with said band.

The compressor-arm $3^a$ is pivoted at 46 to an arm, 32, that is secured to a shaft, 33. The extension 47 of the arm $3^a$ is provided with a spring, 48, that lies between it and a vertical projection, 49, that forms a part of the arm 32. To keep the spring 48 in position we fit its two ends into recesses, one of which is formed in the extension 47 and the other in the vertical projection 49. As an additional security we employ a rod, 50, that passes loosely through the center of the spring 48, also through the extension 47 and vertical projection 49. To the bottom end, 51, of the compressor-arm $3^a$ we pivot an auxiliary and yielding arm, 52, provided with a spring, 53, and a retaining-rod, 54, to hold said spring to its place. The spring 48 permits the arm $3^a$ to yield under undue pressure, and thus prevent breakage. The spring 53, attached to the arm 52, performs a similar duty. The spring 48, in addition to performing the above specified function, also permits the arm $3^a$ to oscillate in a limited space upon the pivot 46 while the packers 4 and 5 are forcing grain against it, and when the bundle is discharged returns it to its normal position. The auxiliary arm 52 is so shaped and located as to materially assist in the formation of a round sheaf.

The knotting device is of that kind known as a "knot-tying bill," and it consists of a vertical shaft, 55, provided with a horizontal hook, 56, grooved in the direction of its length to receive a tongue, 57, that is pivoted to said hook. The tongue 57 is provided with a heel-extension, slotted at 59 to receive a pin forming a part of a vertical rod, 60. The top end of the rod 60 is provided with two collars, 61 61, between which an extension, 62, from a friction-roller, 63, is loosely fitted. Between the lower collar, 61, and the upper end of the shaft 55 there is a spring, 64, that forces the roller 63 against a cam-track formed around the interior of the rim of the disk 65. A pinion, 66, is firmly secured to the shaft 55, and a section of teeth, 67, forms a part of the disk 65. This section 67 has as many teeth (less one) as the pinion 66, and at the proper time actuates said pinion just one revolution, starting toward the inner side of the binder. This pinion is also provided with the proper timing mechanism to throw it in and hold it out of gear. This timing mechanism consists of a projection, 68, forming a part of the pinion 66, a projection, 69, and two recesses, 70 and 71, forming a part of the disk 65. The projection 69 strikes the projection 68 and starts the pinion 66, and the recesses 70 and 71 make such rotation possible by admitting the corners of the square projection 68. As the disk 65 is rotated by the pinion 72 the friction-roller 63 rides on that part of the internal rim-cam marked 73, and the knotter remains open, as shown, until said friction-roller leaves said cam 73 and is forced by the spring 64 to ride on that part marked 74, when the tongue 57 will close upon the hook 56. As the tongue 57 closes upon the hook 56 the knotter will be passing the ends of the band, which are then held by the gripper 45, and so lie directly in its path, and it is arranged to close upon them and remains closed until the knot is completed in the usual manner. Through the agency of a toothed segment, 75, actuated by an eccentric, 76, fast to the shaft 77, and a pinion, 78, fast to the gripper 45, the gripper 45 turns upon its axis for the purpose of yielding mechanically to the knotter as the loop of the knot is being formed around the shank of the hook 56, and thereby obviate undue strain upon the cord. As the knotter is completing its revolution to form the loop of the knot the cutter and gripper 45$^a$ 45$^b$ receive a longitudinal movement outwardly through the agency of a cam, 79, formed upon the disk 80, a spring-rod, 81, a rod, 82, and a pivoted lever, 83, provided with a friction-roller, 84. The rod 81 is provided with a collar, 85, and a spring, 86, by which means the cutter and gripper 45$^a$ 45$^b$ will be quickly returned for the purpose of cutting the band from the supply and obtaining a new hold upon the supply portion. The rod 81 is fitted with a cone-shaped recess and the rod 82 with a cone-shaped point, which permits the rod 81 to revolve independent of the rod 82. The loop of the knot having been formed around the shank of the hook 56 in the manner above specified, and the two ends of the band secured between the hook 56 and pivoted tongue 57, it only remains for the loop of the knot to be slipped from the hook 56 over the ends held by said hook, and the knot will be complete. To this end we use a horizontal rod, 87, which rides over a portion, 2$^a$, of the cast frame 2 and receives a longitudinal motion from a pivoted lever, 88. The lever 88 receives its motion from a cam, 73$^a$, formed upon the disk 65, and a rod, 89, provided with a friction-roller, 90. The rod 87 at its stripping end has raised ears 91, which fit loosely around the hook 56, whereby the loop of the cord is removed from the hook 56 57 to the ends held by said hook, and the knot is complete, and the cam 73 again raises the roller 63 and the ends of the band will drop from between the hook 56 and tongue 57, and, the friction-roller 90 having left the cam 73$^a$, a spring, 92, will force the stripper to its place of rest, as shown by Fig. 11 of the drawings. The compressor 3$^a$ will now open away from the sheaf, and the binding-arm 42 again descends to its position of rest, and the ejector 93, moving upward while the binding-arm moves downward, will remove the bound sheaf from the binding-table. The ejector is actuated by a toothed sector, 43, gearing into a loose pinion, 94, to which a spring-pallet, 96, is firmly secured, and arranged to engage with a ratchet-wheel, 95, fixed on the shaft 97, in such a manner as to cause said ratchet-wheel to remain at rest during the upward stroke of said sector 43 and to revolve during its downward stroke. The ratchet-wheel 95 is fast to a shaft, 97, having a crank, 98, that connects with the heel portion 99 of the ejector 93 by means of a rod, 100, (for which see Fig. 10, shown partly in dotted lines to avoid confusion.)

It is obvious that the pinion 94 must work loosely upon the shaft 97 in order to run idle during the upward stroke of the sector 43.

The compressor 3$^a$ is actuated by a pinion, 101, fitting loosely on the shaft 41 and on arm 102, fast to the shaft 33, the two being connected by a rod, 103.

The main wheel 25 is provided with a smooth rim, 104, upon which a curved extension, 105, of the pinion 101 rides until it comes to a gap, 106, when a projection at the commencement of said gap strikes the curved piece 105, and the gap permits the curved piece to move and the pinion 105 to come into mesh with the main wheel 25 and make a full revolution before the curved piece 105 strikes the gap 106$^a$ and again engages with the rim 104. The pinion 72 is timed and revolved in precisely the same manner by the rim 107, curved projection 108, gaps 109 110.

The connecting-rod 103 is provided with a movable head, 111, fitting into a slide in the arm 102, and a spring, 112, to permit the arm 102 to make a limited movement independent of the connecting-rod 103. This limited movement suffices to throw the roller 35 out of the recess formed in the end of the cam 34 to the even surface of the cam 34, and thereby throw the movable teeth 26 into mesh with the pinion 27. As the compressor-arm comes to rest during the formation of another sheaf the roller 35 again takes its place in the recess of the cam 34 and the spring-bolt 38 comes into the path of the inclined projection 31, which is fast to the movable teeth 26, and the teeth 26 are raised so as to disconnect the wheel 25 from the pinion 27.

The knotter proper is supported in a bracket, 113, made fast to the frame 2 in any suitable manner.

Having thus described our invention, what we claim as new, and desire to secure by Letters Patent, is—

1. A mechanism for automatically connecting and disconnecting a binding with a harvesting machine, consisting of the arm 3$^a$, movable tooth-section 26, sliding head 28, guideways 29, spring 30, cam-track 31, lever 32, shaft 33, cam-track 34, pivoted lever 36, spring 37, and bolt 38, or their equivalents.

2. The combination of the compressor-shaft with its actuating-pinion and the pitman, connected at one end to an arm on the compressor-shaft by the spring-connection 111 112 and at the other end to a wrist on the pinion, whereby a limited elastic movement of the compressor-shaft is permitted independent of the pinion.

3. The combination of a toothed sector, 43, a pinion, 94, a ratchet-wheel, 95, a spring-pallet, 96, and a connecting-rod, 44, with the ejector 93, the cam 12, and means for operating the sector, whereby the position of the cam 12 is changed by the movement of said sector and the ejector 93 by a return movement of said toothed sector, for the purposes specified.

4. A toothed segment, 75, a pinion, 78, an eccentric, 76, on shaft 77, and connected with the segment by a pivoted lever, and a pivoted lever, 83, in combination with a cutter and gripper, 45, substantially as and for the purpose specified.

5. A shaft, 77, provided with a disk, 80, and cam 79, whereby the lever 83 and the gripper and cutter-rod 82 are actuated, and a disk, 65, provided with cam 73 and segment-gear 67, combined with the knotter 55 56 57 60, the pinion 66, roller 63, and spring 64, whereby the knotter and the gripper and cutter are actuated by the same shaft, as set forth.

6. The combination, with a wheel having a gear-segment, 67, the cams 73 73$^a$, of a knotter, 55 56 57 60 63 64 66, and a stripper, 87 91, lever 88, rod 89, friction-roller 90, and spring 92, to return the stripper to its place of rest, as set forth.

7. A compress-arm, 3$^a$, hinged to the part 32 of the frame, and provided with a spring, 48, in combination with an auxiliary compress, 52, hinged to the extremity of said compress 3$^a$, and provided with spring 53, as and for the purpose specified.

In testimony whereof we have hereunto set our hands this 29th day of October, 1881.

WILLIAM N. WHITELEY.
JOHN R. THOMAS.

Witnesses:
HENRY MILLWARD,
AUGUSTUS N. SUMMERS.